United States Patent [19]
Olson

[11] 3,995,938
[45] Dec. 7, 1976

[54] CYCLE REFLECTOR

[76] Inventor: Gust A. Olson, 1527 Princeton St., Santa Monica, Calif. 90404

[22] Filed: Mar. 17, 1975

[21] Appl. No.: 559,287

[52] U.S. Cl. .................................. 350/99; 350/97; 301/37 SA
[51] Int. Cl.² ..................... G02B 5/12; G02B 5/122
[58] Field of Search ................. 350/99; 301/37 SA

[56] References Cited
UNITED STATES PATENTS

| | | | |
|---|---|---|---|
| 2,344,542 | 3/1941 | Fiki | 301/37 SA |
| 3,895,855 | 7/1975 | Nagel | 350/103 |

FOREIGN PATENTS OR APPLICATIONS 421,321   12/1934   United Kingdom

*Primary Examiner*—John K. Corbin
*Assistant Examiner*—B. Wm. de los Reyes
*Attorney, Agent, or Firm*—Harry R. Lubcke

[57] ABSTRACT

A light-reflective attachment to the spokes of a cycle wheel, formed for lug attachment where adjacent spokes cross relatively near the hub; to reflect light principally in the direction the wheel travels, and alternatively additionally at right angles thereto.

10 Claims, 9 Drawing Figures

U.S. Patent     Dec. 7, 1976     3,995,938
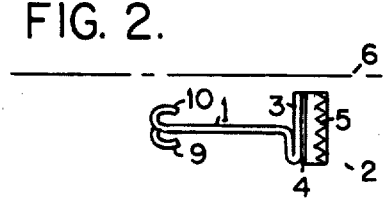
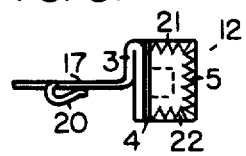
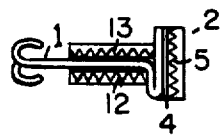
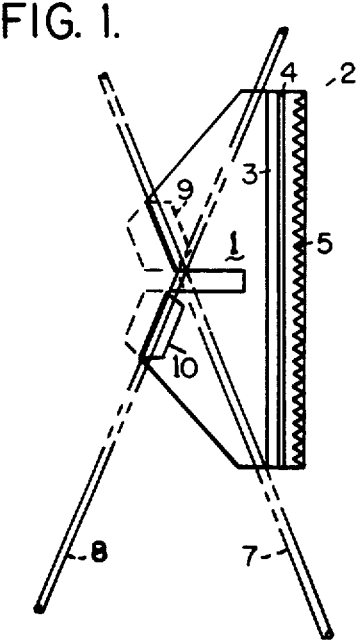
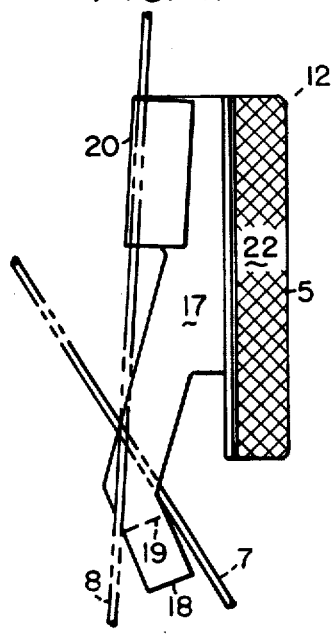
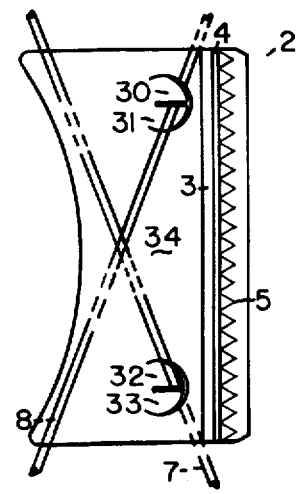
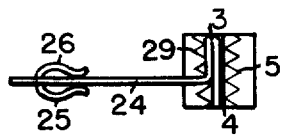
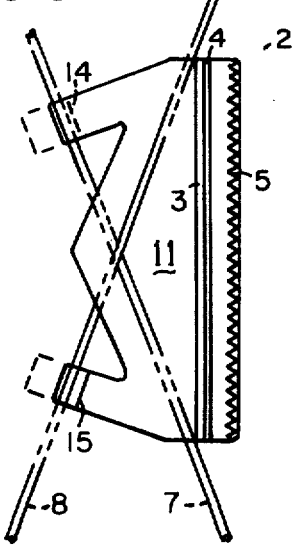
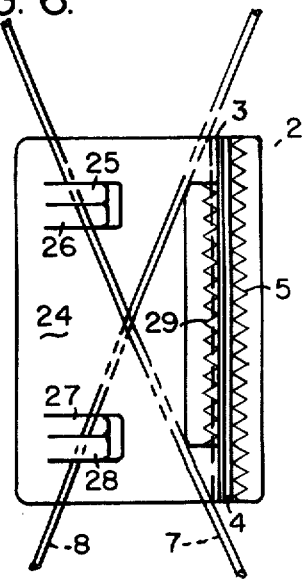

CYCLE REFLECTOR

BACKGROUND OF THE INVENTION

The art has disclosed light-reflective attachments for bicycles that reflect light principally at right angles to the direction of travel. Also, such attachments are frequently attached to the rim of the wheel, not to the spokes. Further, when attached to the spokes, such attachments have been located relatively near the rim, or to only one spoke, as in the form of a "flag".

Such devices have not provided a moving, and hence attention-getting, visual signal to the operators of other vehicles behind or in front of the bicycle in question.

Also, advantage has not been taken of the additional structural security to be found at the cross-over of adjacent spokes; where essentially four-point support can be attained with simple attachment structures.

BRIEF SUMMARY OF THE INVENTION

The attachment is formed with a plate-shaped fin, which lies between and substantially in the plane of the spokes of the wheel. The fin has at least two tabs which attach to different spokes in each embodiment. In certain alternate embodiments the fin is bent at right angles at such a position as to nest the body against the same two spokes at other longitudinal points thereof. All embodiments have known light-reflecting qualities of polished metal, optically-reflective plastics, or structures employing the Fresnel lens principle to efficiently reflect ambient light, as daylight or light from automobile headlights.

BRIEF DESCRIPTION OF THE DRAWINGS

FIG. 1 shows a side elevation of the cycle reflector of this invention, with a pair of crossing spokes shown in phantom.

FIG. 2 shows a top plan view of the same.

FIG. 3 shows a side elevation of an alternate embodiment in which fastening tabs are located far apart.

FIG. 4 shows a side elevation of a second alternate embodiment in which one tab is bent over two spokes at the same place.

FIG. 5 shows a top view of the same.

FIG. 6 shows a side elevation of a third alternate embodiment in which two dual tabs are employed for fastening.

FIG. 7 shows a top plan view of the same.

FIG. 8 shows a side elevation of a fourth alternate embodiment in which the tabs of the attachment of FIG. 6 embrace the forward parts of a pair of spokes.

FIG. 9 shows a top plan view of additional side reflectors upon the fin of the attachment.

DESCRIPTION OF THE PREFERRED EMBODIMENTS

In FIG. 1, numeral 1 indicates the fin of the attachment of this invention. This is typically disposed at substantially right angles to body 2, which is a composite structure consisting of the right angle part 3 of the fin, an adhesive layer or equivalent 4, and a reflector 5.

The fin lies in a plane substantially parallel to plane 6 of the wheel as a whole. This plane is shown in FIG. 2, but the wheel is not otherwise shown.

A convenient manner of fabricating right angle part 3 is to fold the material of the fin at right angles thereto and then 180° back upon itself to constitute the full extent of part 3. This is shown in FIG. 2. A range of materials, typically metallic, may be used to fabricate the fin structure 1, 3. One suitable malleable material is an aluminum alloy, chosen from the 1100, 3000 or 5000 series.

The light reflecting property desired in one or more directions from the body may be obtained by polishing or plating the material of parts 1 and 3 to a high polish. However, it is desirable to take advantage of the Fresnel lens effect, or of an equivalent reflective polygonal structure 5 that can be cast into plastics. Thus structured material is known and available to the art. The structure may be cast into the front or the rear surface of the plastic substance.

The plastic part 5 may be fastened to the angle part 3 by rivets or other discrete fastenings, but a layer of epoxy or equivalent adhesive 4 provides a simpler satisfactory mode of attachment. A variation of adhesive 4 consists of two-sided double-coated adhesive pressure-sensitive foam elastomer tape. This is commercially obtainable. Relatively permanent adhesion is accomplished by pressing parts 3 and 5 tightly together for a brief period during manufacture, or just prior to use by the customer.

The embodiment illustrated in FIG. 1 is formed for attachment to cycle spoked wheels where the spokes on one side of the wheel cross. This is typically about one-third, as 10 centimeters, of the distance from the hub to the rim of the known cycle wheel.

Some wheels are manufactured with the leading spoke on the outside of the crossing pair, others with the trailing spoke on the outside. This does not affect this invention, since all embodiments may be attached to either configuration. Also, it is desirable that the plane of the reflector surface be at a slight angle to the perpendicular to the plane of the wheel, so that the reflected beam will avoid the rim of the wheel.

The attachment may be made in various sizes, practically limited by a minimum size that reflects enough light to be easily seen by a pedestrian or the driver of a motor vehicle, and by a maximum size that will not strike the forks or other stationary part of the cycle. A typical size for the embodiment of FIG. 1 is 6.5 cm. high, 1.3 cm wide, and 2.5 cm from front to back.

In FIG. 1 a pair of adjacent spokes 7, 8, on one side of the hub of the wheel (not shown) are shown in phantom dot-dash lines. Note that the forward segments of the spokes rest against the rear of right angle part 3. The fin 1 is entered between the spokes at their cross-over. The rear extremities of fin 1 are bent over the spoke adjacent thereto. The upper extremity is bent toward the reader and forms tab 9. The lower extremity is bent away from the reader and forms tab 10. This is for the case when spoke 7 is nearer the reader. If spoke 8 is nearer the reader the tabs are oppositely bent. The metal of the fin in malleable and so the tabs can be bent by hand, or easily with a pair of pliers. The result is an attachment that is securely fastened.

The embodiment of FIG. 3 follows closely that of FIG. 1, save that the tabs are disposed upon extensions of fin 11 at the top and bottom thereof, rather than near the middle.

With spoke 7 being the rear spoke, upper tab 14 is bent away from the reader and the lower tab 15 oppositely. Should the spokes cross in the opposite manner both tabs are then bent in the opposite directions.

The top plan view of the embodiment of FIG. 3 is essentially the same as that for FIG. 1; i.e., FIG. 2, so this figure has not been repeated.

The embodiment of FIG. 4 has a fin 17, which is similar to prior fins by having tab 20 formed around one spoke, but different in that a lower tab 18 is relatively vertically disposed and is longer in the fold-over portion. It is shown in the non-folded configuration. The fold is made at dotted line 19, upwardly, so as to bear against the junction of the two illustrative spokes 7 and 8 and to embrace them on both sides. The objective is the same as previously — to derive stability for the attachment by engaging the cross-over of the spokes. Upper tab 20 is also longer than before. It preferably embraces the forward one of the pair of spokes.

The body assembly 12 is similar to the prior body assembly 2 of FIG. 2. In addition; however, Fresnel reflective surfaces are now provided on the sides, at 21 and 22, and the inside may be hollow, as shown dotted in FIG. 5. There is no difficulty in supplying the additional reflectivity, there is nothing in the optical path.

Ordinances in certain areas of the country require side-directed reflectors, to warn others that are located broadside of the cycle of its presence. With the simple forward-reflective surface 5 of FIG. 1, reflection to the side can be provided by also using exclusively side-reflecting attachment, which are known.

FIG. 9 shows an embodiment in which a side-reflective surface 12 is attached to the forward area of fin 1, also opposite surface 13.

With the forward and back reflectivity according to this invention the placement of the attachment at the cross points of the spokes locates it suitably away from the rim and tire of the cycle wheel so that these elements will not optically block the reflected light beam. Also, the slight cant of adjacent spokes on one side of the hub, as these engage the tabs, provides a slight off-plane orientation with respect to the mounting plane of the wheel, so that the reflected beam will not be intercepted by the rim or the tire.

FIG. 6 illustrates a further embodiment, in which a fin 24 has a substantially rectangular shape and is of greater size than before. This provides room for a pair of bifurcated tabs 25,26 and 27,28 to selectively engage spokes 7 and 8. When spoke 7 is the near spoke tabs 25 and 27 will engage respective spokes. When spoke 8 is the near spoke tab 26 engages spoke 7 and tab 28 engages spoke 8. The spoke lacing method of the manufacturer determines which spoke is the nearer.

FIG. 6 and 7 also show a rearwardly-disposed reflective surface 29. This surface reflects to the rear of the cycle at the same time as surface 5 is reflecting forward; i.e., when the attachment is vertically oriented above the hub of the wheel. One-half turn later, when the attachment is vertically below the hub, the reflective paths of the two reflective surfaces are interchanged. Surface 29 is lesser in extent than is surface 5, so that spokes 7 and 8 will fit against metallic surface 3. As seen in FIG. 7, surface 29 is divided, to accommodate fin 24 at approximately the middle of the surface.

Certain minor alternates further consist of extending surface 29 to the full extent of surface 5 and providing a notch for the spokes, also, moving the tabs to engage the forward parts of the spokes, rather than the backward parts thereof.

This modification is shown in FIG. 8. Bifurcated tabs 30, 31, 32 and 33 are as before. As an alternate to the rectilinear tabs of FIG. 6, these may be formed from a partial semicircular punch-out with a central slit. The body 2 may be the same as previously. Which two of the four tabs are used in an installation follows the procedure set forth with respect to the embodiment of FIG. 6. Fin 34 is terminated in rearward extent just behind the cross-over point of the spokes, and may be curved to enhance esthetic style.

Certain characteristics of the subject invention include; a thin pin adapted to fit between a pair of crossing spokes, the fin being sufficiently stiff to hold the body in a predetermined attitude, yet sufficiently soft in the embodiments of FIGS. 1, 3 and 4 to allow wrapping the tabs around the spokes by hand or with a simple tool.

A principal application for the attachment of this invention is for bicycles, there being a new epoch in the use of this vehicle for ecological non-air-polluting reasons. However, the attachment may also be employed, perhaps in larger sizes, for motor-cycles, motor-scooters, or sport automobiles having wire wheels. The new design of bicycles, with narrow rims and tires, encourages the use of this invention.

Certain embodiments have been illustrated as side or rear reflecting as well as for one-directional forward reflecting. In general, any of the embodiments may be made side or two-directional reflecting, or both, in accordance with the invention. Also, a known thin plastic reflective material, as Scotchlite reflective sheeting, may be used for reflector 5 and other reflective surfaces.

I claim:
1. An attachment for a wheel having wire-like spokes, comprising;
   a. a substantially flat light-reflective body (2), having a fin (1,11,17,24,34) extending therefrom and between two spokes at their cross-over,
   b. plural tabs (9,10,14,15,25,27,30,32,26,28,31,33,18,20) extending from said fin and spaced to engage at least two of said spokes (7,8) on opposite sides of the cross-over thereof,
   said tabs disposed with respect to said fin to fixedly retain the flat surface of said body in a plane substantially perpendicular to the plane (6) of said wheel,
   for reflecting light substantially parallel to the plane of said wheel.
2. The attachment of claim 1, in which;
   a. said tabs (9,10) are respectively adjacent at the extremity of said fin, away from said body.
3. The attachment of claim 1, in which;
   a. said tabs (14,15) are formed at opposite ends of said fin (11).
4. The attachment of claim 1, in which;
   a. one said tab (20) is formed to embrace one of said spokes, and
   b. another said tab (18) is disposed at the opposite end of the fin from said one tab, and is formed to embrace two said spokes at adjacent the cross-over point thereof.
5. The attachment of claim 1, in which;
   a. said tabs (25–28) are disposed within the perimeter of said fin (24), and
   b. each tab is bifurcated to appropriately engage one said spoke, and to urge said body (2) against an adjacent spoke.
6. The attachment of claim 1, in which;
   a. said body is at right angles to said fin.
7. The attachment of claim 1, which additionally includes;

a. a reflective surface (21,22) on a side of said body to reflect light at substantially right angles to the plane (6) of said wheel.

8. The attachment of claim 1, which additionally includes;
   a. a second light-reflective surface (29) rearwardly disposed with respect to a first light-reflective surface (5) of said body (2), for reflecting light in substantially the plane of said wheel oppositely to the light reflected by said first light-reflective surface.

9. The attachment of claim 1, in which;
   a. said tabs (30–33) are disposed adjacent to said body (2,3) upon said fin (34), and engage said spokes between the contact thereof with said body and the crossing thereof.

10. The attachment of claim 1, in which;
    a. a reflective surface (12,13) is attached to at least one side of said fin (1,11,17,34).

* * * * *